United States Patent [19]
Haschke et al.

[11] Patent Number: 5,773,495
[45] Date of Patent: Jun. 30, 1998

[54] USE OF PLASTICISERS FOR THERMO-PLASTICIZING STARCH

[75] Inventors: Heinz Haschke, Kottingbrunn, Austria; Ivan Tomka, Bourguillon, Switzerland

[73] Assignee: Teich Aktiengellschaft, Obergrafendorf, Austria

[21] Appl. No.: 750,975

[22] PCT Filed: May 9, 1996

[86] PCT No.: PCT/AT96/00093

§ 371 Date: Jan. 3, 1997

§ 102(e) Date: Jan. 3, 1997

[87] PCT Pub. No.: WO96/35748

PCT Pub. Date: Nov. 14, 1996

[30] Foreign Application Priority Data

May 11, 1995 [AT] Austria ................................. A 791/95

[51] Int. Cl.$^6$ ...................................................... C08L 3/02
[52] U.S. Cl. ............................ 524/52; 524/47; 525/54.26
[58] Field of Search .......................... 525/54.26; 524/47, 524/52

[56] References Cited

U.S. PATENT DOCUMENTS

| | | | |
|---|---|---|---|
| 2,130,212 | 9/1938 | Watkins | 525/61 X |
| 3,034,999 | 5/1962 | Wilson | 525/56 |
| 3,098,049 | 7/1963 | Borchert | 524/563 |
| 3,312,641 | 4/1967 | Young | 524/47 |
| 3,316,190 | 4/1967 | Suzumura et al. | 524/48 |
| 3,372,156 | 3/1968 | Schwarzer et al. | 536/87 |
| 3,625,746 | 12/1971 | Ayukawa et al. | 525/54.26 X |
| 3,673,125 | 6/1972 | Takahashi et al. | 524/52 |
| 3,737,398 | 6/1973 | Yamaguchi | 525/56 |
| 3,838,957 | 10/1974 | Koide et al. | 425/174.6 |
| 3,949,145 | 4/1976 | Otey et al. | 428/423 |
| 3,959,406 | 5/1976 | Tsuji et al. | 525/57 |
| 4,272,470 | 6/1981 | Hsu et al. | 264/104 |
| 4,357,402 | 11/1982 | Sheibley et al. | 525/61 X |
| 4,419,316 | 12/1983 | Schweiger | 264/184 |
| 5,258,430 | 11/1993 | Bastioli et al. | 525/61 X |
| 5,276,088 | 1/1994 | Yoshinaga | 525/54.3 |
| 5,405,564 | 4/1995 | Stepto et al. | 264/115 |

FOREIGN PATENT DOCUMENTS

| | | |
|---|---|---|
| A-0283180 | 9/1988 | European Pat. Off. . |
| 0 304 401 | 2/1989 | European Pat. Off. . |
| 0 404 723 | 12/1990 | European Pat. Off. . |
| 14 94 148 | 12/1969 | Germany . |
| 2 045 811 | 4/1972 | Germany . |
| 02-60906 | 3/1990 | Japan ............................ C08F 16/38 |
| 96/03443 | 2/1996 | WIPO . |

OTHER PUBLICATIONS

H. Roth, "Methoden er organischen Chem. (Houben–Weyl)", vol. II, 1953, Georg Thieme Verlag, Stuttgart, pp. 427–428.
Chemical Abstract 88, 24453t (vol. 88, 1978).
J. Macromol. Sci.–Chem. A13(7), pp. 937–952 (1979).
Chemical Abstract 103, 72848a (vol. 103, 1985).
Chemical Abstract 105, 56225f (vol. 105, 1986).
J. Polym. Mater. 5 (1988) 241–247.

*Primary Examiner*—Peter A. Szekely
*Attorney, Agent, or Firm*—Bacon & Thomas

[57] ABSTRACT

The invention relates to the use of biodegradable graft copolymers producible in the presence of empirically determined quantities of water from polyvinyl alcohols with a degree of saponification of 88 to 99.5 mol. % by an acid catalysed acetalisation and/or transacetylisation reaction with carbohydrates containing carbonyl groups or presumptive carbonyl groups, in which the degree of acetqalisation, expressed in carbonyl equivalents per 100 vinyl alcohol equivalents, is between 0.2 and 20, and preferably between 1 and 10, as a plasticiser for the thermoplaticisation of starch and/or starch mixtures.

28 Claims, No Drawings

USE OF PLASTICISERS FOR THERMO-PLASTICIZING STARCH

BACKGROUND OF THE INVENTION

1. Field of the Invention

The invention relates to the use of plasticisers for thermo-plasticising starch.

2. Description of Related Art

As a polymer starting material, starch is suitable for a plurality of applications particularly in the field of the packaging industry owing to its ecological properties. In contrast to the polymer raw materials which can be gained by the petrochemical industry, starch is a regrowable natural material which, in addition, is biologically degradable. The demand is placed on this natural polymer, as is on the synthetic polymers, to be easily processable at increased temperatures. These thermoplastic properties, however, are caused by the molecular structure. Thus it has been seen that long-chain unbranched molecules show favourable thermo-plastic properties, whereas branched molecules such as the amylo pectin of starch, and in particular cross-linked molecules such as native starch, practically have no thermoplastic properties.

It has now been seen that the union of molecules of starch which are cross-linked via intermolecular and intramolecular hydrogen bridges can be loosened up by the addition of plasticisers in the presence of water.

Pursuant to U.S. Pat. No. 5,362,777, glycerol is used as plasticiser. The effect of glycerol as plasticiser consists of the fact that the small movable glycerol molecules push between the chain molecules in the presence of water quantities to be determined empirically and thus prevent the formation of hydrogen bridge-type bonds between the starch molecules, so that the largely undesirable cross-linking of the starch molecules can be prevented. As a result of this interaction between the glycerol and the starch molecules, a kind of an envelope is formed around the starch molecules, so that the coiled union of molecules of starch is loosened up and thus a molecular laminar and thus thermoplastic (i.e. with flowing capabilities) condition of the starch can be achieved. The disadvantage of such small movable plasticiser molecules such as glycerol is that they migrate from the union of molecules by diffusion and, in particular, in contact with water-containing materials, with the water acting as extraction agent.

If such thermo-plasticised starch products are used as packaging materials, the packaged goods are contaminated by the migrating plasticiser molecules.

Efforts were therefore made to use higher molecular substances, which owing to their bulky molecular structures do not tend to such migration, as plasticisers for starch also in the presence of empirically determinable water quantities. Pursuant to EP-A 304 401 thermoplastic polyvinyl alcohol is proposed as plasticiser. As a result of its high-molecular structure it does not migrate from the union of starch molecules. However, in the case of pure polyvinyl alcohol it is not sufficiently water soluble owing to its high degree of saponification, namely over 99%. Partly acetylated polyvinyl alcohol with 10 mol % of vinyl acetate units, for example, is suitable, but under increased temperatures it tends to the cleavage of acetic acid, because the acetyl group can easily be split off both thermally as well as acid- and base-catalysed. The cleavage of acetic acid is particularly undesirable with respect to foodstuff packagings.

It is therefore the object of the invention to eliminate the aforementioned disadvantages in the use of plasticisers for the thermo-plasticising of starch.

SUMMARY OF THE INVENTION

In accordance with the invention, the use of biologically degradable graft copolymers in the presence of empirically determined quantities of water as plasticiser for the thermo-plasticising of starch and/or starch mixtures is proposed which are producible from polyvinyl alcohols with a degree of saponification of 88 to 99.5 mol % by acid-catalysed acetalisation and/or transacetalisation reaction with carbohydrates containing carbonyl groups or presumptive carbonyl groups, with the degree of acetalisation, expressed in carbonyl equivalents per 100 vinyl alcohol equivalents, being between 0.2 and 20, and preferably between 1 and 10. Particularly preferable is the use of graft co-polymerisates which are producible from polyvinyl alcohols and carbohydrates on the basis of starch degradation products at a ratio of 2 to 5 carbonyl equivalents to 100 vinyl alcohol equivalents corresponding to a degree of acetalisation of 4 to 10 mol % relating to the hydroxyl groups of the applied polyvinyl alcohol.

In this respect a carbonyl equivalent shall be defined as the mean (numerical average) molecular weight of the applied carbonyl or presumptive carbonyl groups divided by the mean number of carbonyl groups or presumptive carbonyl groups. It can therefore be calculated if the structural formula is known or it can be determined by oxime formation according to R. C. Schulz et al (Makromol. Chemie 20 [1956], 161). Therefore, the vinyl alcohol equivalent is calculated according to $$equ^M VA = \frac{44 \cdot \% V + 86 \cdot (1 - \% V)}{\% V},$$

with % V being the percentage degree of saponification of the applied polyvinyl alcohol of polyvinyl acetate.

All types of polyvinyl alcohols are principally suitable as long as their degree of saponification is at least 80 mol %. If the degree of saponification is too low, the graft copolymerisate produced therefrom again tends towards a marked cleavage of acetic acid. From degrees of saponification of 88% upwards, and in particular from 95%, the cleavage of acetic acid, however, is already so low or residual acetate is split off during the acid-catalysed acetalisation reaction to such an extent and in particular during the reaction in the kneader or extruder of the granulate production is completely evaporated to such an extent that practically no impairing acetate migration occurs.

Mainly for theological reasons, but also for reasons of faster biodegradability, low-molecular polyvinyl alcohols are used more likely as starting materials for the use of the graft copolymerisate in accordance with the invention. Although polyvinyl alcohols with polymerisation degrees of between 10 and 4000 are principally suitable, preferably such with mean polymerisation degrees of between 50 and 2800, preferably between 100 and 1500, are used. Particularly preferable are such with mean polymerisation degrees of between 200 and 750. This graft copolymerisate surprisingly shows a plasticiser effect similar to the aforementioned glycerol, although it is a high-molecular compound consisting of the polyvinyl alcohol parent chain and the carbohydrate side chains. Although a heterogeneous molecular structure should have been expected as in starch per se owing to these carbohydrate side chains, this graft copolymerisate nevertheless pushes between the starch molecules with its dipoles and hydrogen-bridge-forming groups similar to the aforementioned glycerol, so that the heterogeneous union of molecules of starch is loosened up and its thermo-plasticising occurs, with the starch being completely molten in the melt of the graft copolymerisate.

A further advantage of the invention is that the said graft copolymerisates can also be used as plasticisers for mixtures (so-called blends) consisting of starch and other thermoplastic polymers such as polyester, in particular polyesters made from hydroxyalkanoates and/or alkane diols with alkane dicarboxylic acids. The starch mixtures consist, for example, of native potato starch and polycaprolacton, polyhydroxy butyrate, polyhydroxy valerate or polyesters made from ethylene glycol, propylene glycol and maleic acid or fumaric acid.

Further advantages of the use in accordance with the invention are that the degree of saponification of the polyvinyl alcohol can lie in a preferable embodiment between 90 and 99 mol %, in particular between 95 and 99 mol %, and the carbohydrate can be a monosaccharide, preferably an aldose, or a disaccharide, preferably a reducing "ose" type, or a polysaccharide, preferably starch or a starch degradation product, with the starch degradation product preferably being a partly hydrolysed degradation product produced by acid catalysis.

In connection with the use in accordance with the invention the polysaccharide can further be a degradation product produced from starch by oxidation reaction. The oxidation reaction can be carried out on native starch in the presence of an aqueous hypochlorite solution.

Further advantages of the use in accordance with the invention are that the polysaccharide is a starch degradation product produced from starch by thermal and mechanical loading and the thus initiated uncoiling of the starch molecules and by the cleavage of cross-linkages and partial dehydratation or pyrolysis reactions and by chemical-hydrolytic degradation in the presence of acidic or basic catalysts, which starch degradation product has a maximum of half, preferably not more than $\frac{1}{10}$, of the average molecular weight of the amylose share of the applied starch.

The use in accordance with the invention is further characterized in that the carbohydrate has less than one, preferably less than 0.5, carbonyl group(s) or presumptive carbonyl group(s) per monosaccharide unit. Preferably, the carbohydrate has a maximum of two carbonyl groups or presumptive carbonyl groups in the case of starch degradation products, in particular only one carbonyl group or presumptive carbonyl group per starch degradation product molecule. Presumptive carbonyl groups are such which under acid-catalysed acetalisation conditions will form functional groups which show the reactions typical for aldehyde and keto groups, namely the acetal formation with alcohols or the oxime formation with with hydroxyl amine. Such groups can be determined with oxime titration methods such as given by R. C. Schulz et al. (Makromol. Chemie 20 [1956], 161). These concern, for example, the semi-acetalised end groups of starch and their degradation products, but not the cyclic full acetals of the individual pyranose rings along a starch molecule.

DETAILED DESCRIPTION OF THE PREFERRED EMBODIMENT

The invention is now explained in closer detail by reference to an embodiment and to comparative examples:

A. General Working Instructions for the Production of the Biodegradable Graft Copolymerisate

A.1 Performance on a Laboratory Scale

In a reaction vessel, provided with a Soxhlet and a reflux condenser, a solution of 1 g of polyvinyl alcohol of the MOWIOL x-yz type of Hoechst company with a degree of saponification V in mol %, a mean polymerisation degree $P_W$, corresponding to a mean molecular weight $M_W$ is charged in 10 ml of dimethyl sulphoxide (DMSO).

3 g of a starch degradation product, which has been degraded by hydrolytic degradation of native starch to the molecular weight $_{st}M_n$, is added to this solution. This mixture is heated to 120° C. under mixing. Thereafter a vacuum of 15 mm Hg is applied. In the Soxhlet, which is disposed between the reaction vessel and the reflux condenser, a molecular sieve (grain size of 4 Angstrom) can optionally be used as desiccant. Thereafter the acidic catalyst is added in a quantity relating to 100 g of weighed portion of polyvinyl alcohol. After the addition of the acidic catalyst the acetal formation commences. The reaction mixture is stirred thereafter for another five hours under return flow in the vacuum. Thereafter the reaction mixture is cooled and neutralised by the addition of a quantity of basic compounds which is stoichiometric with respect to the applied acidic catalyst. Suitable basic compounds are sodium carbonate, triethylamine or triethanolamine. The neutralisation is verified by means of pH glass electrode (single-rod gauging chain), for which purpose a sample of 1 ml of reaction mixture is taken and diluted to 50 ml with distilled water. After the neutralisation, for approx. 24 hours dialysis is made against water, with dialysis tubing with a molecular separation volume $TR_{max}$ being used. DMSO and the neutralised catalyst are separated by the dialysis. The remaining reaction solution is poured into an excess of ethanol, so that all organic constituents are precipitated. The filtered-off precipitation cake is treated with dimethylformamide (DMF), with the graft copolymerisate formed going into solution and finally unreacted starch degradation product remaining as residue.

The aforementioned trial parameters can be taken from table 1. The abbreviations used therein are explained as follows:

pTosS=toluene-p-sulphonic acid
GF test="Closed bottle test" according to W. K. Fischer; Fette-Seifen-Anstrichmittel 65(1963), 1S 37ff
OF test="Open bottle test"; (mod. Sturm test, OECD directive 301 B; working instructions EMPA sop 147); analogous to GF test, but at constant $O_2$ concentration in the SAPROMAT (Voith Co., D-7920 Heidenheim a.d.Brenz)

TABLE I

| Example no. | 2 | 3 | 4 | 5 | 6 | 7 | 8 |
|---|---|---|---|---|---|---|---|
| Degree of sap. V mol % | 98.5 | 98.5 | 98.5 | 98.5 | 88 | 88 | 88 |
| Mean deg. of polymer. $P_W$ | 1400 | 1000 | 600 | 360 | 2700 | 1400 | 750 |
| $M_W$-PVA approx. | 62000 | 45000 | 27000 | 16000 | 130000 | 67000 | 37000 |

TABLE I-continued

| Example no. | 2 | 3 | 4 | 5 | 6 | 7 | 8 |
|---|---|---|---|---|---|---|---|
| MOWIOL type x-yz | 10-98 | 6-98 | 4-98 | 3-98 | 18-88 | 8-88 | 5-88 |
| Native starch | Potato | Tapioca | Potato | Maize | Maize | Rice | Maize |
| degr. to $_{st}M_n$ | 8000 | 2000 | 5000 | 20000 | 8000 | 40000 | 1000 |
| Mol sieve | yes | no | no | no | no | yes | no |
| Catalyst | $P_2O_5$ | $H_3PO_4$ | $H_3PO_4$ | p-TosS | $H_3PO_4$ | HCl | $P_2O_5$ |
| g/100 g PVA | 3 | 5 | 5 | 5 | 7 | 5 | 2 |
| $Tr_{max}$ | 12000 | 8000 | 12000 | 25000 | 12000 | 50000 | 8000 |
| 10 kg/h plast per h kg/h | 11.8 | 15 | 15 | 10 | 20 | 25 | 30 |
| OF test % mineral in 28 d | 62 | 63 | 65 | 67 | 47 | 55 | 66 |
| GF test % $BSBT_{30d}$ | 48 | 52 | 57 | 62 | 43 | 41 | 45 |
| Strain after fracture | 18 | 17 | 15 | 12 | 25 | 12 | 12 |

A.2 Performance on an Industrial Scale

The biologically degradable graft copolymerisate can be produced in a two-shaft extruder. In the present performance of the trial the diameter of the extruder screw is 46 mm. The length of the casing corresponds to four times the screw diameter. The extruder apparatus further comprises three dosing mechanisms. Through dosing mechanism 1, hydrolytically degraded starch ($_{st}M_n$=2000; comprising 18 kg of water to 100 kg of dried starch degradation product) is charged in a dosed quantity of 5.9 kg per hour, for example, into the extruder casing. Through dosing mechanism 2 (in casing 3), the polyvinyl alcohol (type MOWIOL 8-88 of HOECHST AG) is introduced into the extruder in a quantity of 5.0 kg per hour, for example. This charging ratio corresponds to 96.76 g of starch degradation product (dry) to 100 g of polyvinyl alcohol (i.e. 49 weight % of starch component in the initial mixture or 2.2 carbonyl equivalents per 100 vinyl alcohol equivalents (actelisation degree: 4%)). Through dosing mechanism 3 (in casing 6) the acidic catalyst is added to the reaction mixture in a solids dosage of 0.1 kg per hour. The extruder apparatus is further provided at the end with a granulating device. The temperature setting at the respective casing can be selected as follows:

```
         1   2   3    4    5    6–10
°C:     20  50  130  180  200  160
```

The rotational speed of the screw is 100 r.p.m. for example. With this extruder apparatus the biologically degradable graft copolymerisate can be gained in the form of granules which are soluble in hot water. The acetalisation degree of the granulate is 4 mol % for example.

B General Working Instructions for the Use of the Biodegradable Graft Copolymerisate in Accordance with the Invention, Produced According to Steps A1 or A2 for Thermo-plasticising Starch.

In a second process step the biodegradable graft copolymerisate can be used in the same two-shaft extruder as mentioned under A2 and at the same temperature setting as plasticiser for thermoplasticising starch in accordance with the invention as follows:

Native potato starch with 18 kg of water content per 100 kg starch is introduced into the casing 1 with a dosing mechanism at a quantity of 11.8 kg per hour in the extruder apparatus. At casing 3, the plasticiser as produced under A is added in a dosing quantity of 10 kg per hour to the extruder casing with a further dosing mechanism. A granulate is obtained which can be further processed in a thermoplastic way into moulded bodies, foils and fibres. The following properties are measured in a foil with a thickness of 30 μm produced by extrusion through a slot die from the aforementioned granulate:

- the strain after fracture in MPa
- the quantity of migration-capable substances (measured according to the E98 test) in mg/dm$^2$ as well as
- the biodegradability (measured according to the OF and according to the GF test)

The values of trials A, B are set out in table I. These values from table I are now compared with the comparative values by using known plasticisers for the plasticising of starch.

TABLE II

|  | Strain after fracture in MPa | Migration-capable substances in mg/dm | Biodegradability OF test | Biodegradability GF test |
|---|---|---|---|---|
| Comparative example 1: | | | | |
| Softener: Glycerole | 12 MPa | >10 mg/dm$^2$ | 30d: 100% | 30d: 96% |
| Comparative example 2: | | | | |
| Softener: Polyvinyl alcohol of type MOWIOL 18-88 | 12 MPa | 12 mg/dm$^2$ | 30d: 29% | 30d: 24% |

TABLE II-continued

|  | Strain after fracture in MPa | Migration-capable substances in mg/dm | Biodegradability OF test | Biodegradability GF test |
|---|---|---|---|---|
| Comparative example 3: | | | | |
| Softener: Polyvinyl alcohol of type MOWIOL 10-98 | 6 MPa | 2 mg/dm$^2$ | 30d: 32% | 30d: 28% |
| Comparative example 4: | | | | |
| Softener: Blend of polyvinyl alcohol and starch according to EP-A 304401 | 6 MPa | — | 30d: 34% | 30d: 30% |

If the values from table II are compared with the values of table I, then it can be seen that particularly the use in accordance with the invention shows a content of migration-capable substances <1 mg/dm$^2$, whereas the comparative examples 1 and 2 with the corresponding values show a value of 12 mg/dm$^2$ of migratable substances. Although the proportion of migration-capable substances is relatively low pursuant to comparative example 3 (but still inadmissible for foodstuff packagings), namely only 2 mg/dm$^2$, the thermoplasticising effect of the plasticiser is so low that the finished foil only has a strain after fracture of 6 MPa.

Moreover, the use in accordance with the invention shows a very favourable biodegradability of the graft copolymerisate to $CO_2$ and $H_2O$, whereas the biological degradation stagnates at approx. 30% of depletion of dissolved oxygen in the GF test pursuant to the comparative examples 2 and 3 in polyvinyl alcohols and also in blends of polyvinyl alcohol and starch pursuant comparative example 4.

The commercial applicability of the aforementioned biodegradable graft copolymerisate can be seen in the use as plasticiser for thermo-plasticising starch and/or starch mixtures. This application is superior to known applications in the respect that the complete degradability of the plasticiser, on the one hand, and sufficient thermoplasticising of starch and a low content of migratable substances, on the other hand, in comparison with known plasticisers are ensured.

We claim:

1. A method for thermo-plasticising starch and/or starch mixtures comprising adding to said starch and/or starch mixtures one or more biodegradable graft copolymerisates which in the presence of empirically determined quantities of water are producible from polyvinyl alcohols with a degree of saponification of 88 to 99.5 mol % by acid-catalysed acetalisation and/or transacetalisation reaction with carbohydrates containing carbonyl groups or presumptive carbonyl groups, with the degree of acetalisation, expressed in carbonyl equivalents per 100 vinyl alcohol equivalents, being between 0.2 and 20 as plasticiser for thermo-plasticising for said starch and/or starch mixtures.

2. The method as claimed in claim 1, wherein the graft copolymerisate is producible from polyvinyl alcohols and carbohydrates on the basis of starch degradation products at a ratio of 2 to 5 carbonyl equivalents to 100 vinyl alcohol equivalents corresponding to an acetalisation degree of 4 to 10 mol % relating to the hydroxyl groups of the applied polyvinyl alcohol.

3. The method as claimed in claim 1, wherein the starch mixtures contain thermoplastic polymers producible by the conversion of hydroxyalkanoates and/or alkane diols with alkane dicarboxylic acids.

4. The method as claimed in claim 1, wherein the degree of saponification of the polyvinyl alcohol is between 90 and 99 mol %.

5. The method as claimed in claim 1, wherein the carbohydrate is a monosaccharide.

6. The method as claimed in claim 1, wherein the carbohydrate is a disaccharide.

7. The method as claimed in claim 1, wherein the carbohydrate is a polysaccharide.

8. The method as claimed in claim 7, wherein the polysaccharide is starch or a partly hydrolysed degradation product produced from starch by acid catalysis.

9. The method as claimed in claim 7, wherein the polysaccharide is a degradation product produced from starch by oxidation reaction.

10. The method as claimed in claim 9, wherein the oxidation reaction is carried out on native starch in the presence of aqueous hypochlorite solution.

11. The method as claimed in claim 7, wherein the polysaccharide is a starch degradation product, i.e. so-called destructured disintegrated starch, produced from starch by thermal and mechanical loading and the thus initiated uncoiling of the starch molecules and by the cleavage of cross-linkages and partial dehydratation or pyrolysis reactions.

12. The method as claimed in claim 7, wherein the polysaccharide is a starch degradation product produced from starch by thermal and mechanical loading and thus initiated uncoiling of the starch molecules and by the cleavage of crosslinkages and optionally also partial dehydratation or pyrolysis reactions and by chemical-hydrolytic degradation in the presence of acidic or basic catalysts, which starch degradation product has a maximum of half of the average molecular weight of the amylose share of the applied starch.

13. The method as claimed in claim 12, wherein the carbonyl equivalent weight of the applied starch degradation product lies between 500 and 10000.

14. The method as claimed in claim 1, wherein the carbohydrate has less than one carbonyl group(s) or presumptive carbonyl group(s) per monosaccharide unit.

15. The method as claimed in claim 1, wherein the carbohydrate has a maximum of two carbonyl groups or presumptive carbonyl groups per starch degradation product molecule.

16. The method as claimed in claim 1, wherein the polymerisation degree of the polyvinyl alcohol is between 10 and 4000.

17. The method as claimed in claim 16, wherein the polymerisation degree is between 100 and 1500.

18. A thermo-plasticised starch and/or starch mixture prepared by the method of claim 1.

19. The method of claim 1 wherein said degree of acetalisation is between 1 and 10.

20. The method of claim 3 wherein said thermoplastic polymers include polyester.

21. The method of claim 4 wherein the degree of saponification of the polyvinyl alcohol is between 95 and 99 mol %.

22. The method of claim 5 wherein the monosaccharide is an aldose.

23. The method of claim 6 wherein the disaccharide is a reducing "ose" disaccharide.

24. The method of claim 12 wherein said starch degradation product has a maximum of not more than 1/10 of the average molecular weight of the amylose share of the applied starch.

25. The method of claim 13 wherein said carbonyl equivalent weight of the applied starch degradation product lies between 1000 and 8000.

26. The method of claim 14 wherein said carbohydrate has less than 0.5 carbonyl group(s) or presumptive carbonyl group(s) per monosaccharide unit.

27. The method of claim 15 wherein said carbohydrate has a maximum of one carbonyl group or presumptive carbonyl group per starch degradation product molecule.

28. The method of claim 16 wherein the polymerization degree of the polyvinyl alcohol is between 50 and 2800.

* * * * *